US007590575B2

(12) United States Patent
Yu et al.

(10) Patent No.: US 7,590,575 B2
(45) Date of Patent: Sep. 15, 2009

(54) METHOD AND APPARATUS FOR CONVERTING, FORMATTING, AND DISPLAYING CURRENCY VALUES

(75) Inventors: Christopher C. Yu, Redmond, WA (US); Stephane J. Viot, Gif-sur-Yvette (FR)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/264,442

(22) Filed: Mar. 8, 1999

(65) Prior Publication Data

US 2003/0097318 A1  May 22, 2003

(51) Int. Cl.
    G06F 17/60 (2006.01)
(52) U.S. Cl. .............................. 705/35; 705/38; 705/39
(58) Field of Classification Search ................ 705/35, 705/38, 39
    See application file for complete search history.

(56) References Cited

U.S. PATENT DOCUMENTS

| 4,916,633 | A | * | 4/1990 | Tychonievich et al. ...... 364/513 |
| 4,989,141 | A | * | 1/1991 | Lyons et al. ................. 364/408 |
| 5,077,804 | A | * | 12/1991 | Richard ......................... 382/7 |
| 5,418,902 | A | * | 5/1995 | West et al. ................... 715/503 |
| 5,437,014 | A | * | 7/1995 | Busboom et al. ............. 395/275 |
| 5,446,885 | A | * | 8/1995 | Moore et al. ................. 395/600 |
| 5,604,854 | A | * | 2/1997 | Glassey ....................... 395/764 |
| 5,623,591 | A | * | 4/1997 | Cseri ........................... 395/326 |
| 5,657,460 | A | * | 8/1997 | Egan et al. ................... 395/326 |
| 5,721,847 | A | * | 2/1998 | Johnson ....................... 395/333 |
| 5,842,205 | A | * | 11/1998 | Brann ............................ 707/4 |
| 5,960,418 | A | * | 9/1999 | Kelly et al. ................... 705/408 |
| 6,038,558 | A | * | 3/2000 | Powers et al. .................. 707/2 |
| 6,065,673 | A | * | 5/2000 | Kokkila ......................... 235/379 |
| 6,138,130 | A | * | 10/2000 | Adler et al. ................... 707/503 |

(Continued)

FOREIGN PATENT DOCUMENTS

DE          19732280         *  7/1997

(Continued)

OTHER PUBLICATIONS

"Council of Ministers: Euro Demand New Procedural Rules"; European Report; brussels Nov 28, 1998.*

(Continued)

*Primary Examiner*—Daniel S Felten
*Assistant Examiner*—Vincent Millin
(74) *Attorney, Agent, or Firm*—Merchant & Gould LLC

(57) ABSTRACT

A conversion function for converting between the euro and other currencies is provided that converts a value in one type of currency to a value in another type of currency according to EU-specified conversion rules and rounding rules. The conversion function may utilize full-precision computation or may convert the value utilizing a user-supplied number of significant digits. A method and apparatus for formatting the results of a conversion in a user-modifiable euro style is also provided. A formatting toolbar button is supplied that when selected applies a euro style to a selected currency value or range of values. A conversion wizard for converting a group of values or functions between the euro and other currencies is also provided. The wizard permits user-selected formula handling options to be selected at the time of conversion. A toolbar for viewing the results of the conversion is also provided. The toolbar provides a floating window that indicates the value of a current location in a user-specified type of currency. The window is updated each time a new location or range of locations is selected, a refresh command is issued, or a new type of currency is selected.

10 Claims, 11 Drawing Sheets

U.S. PATENT DOCUMENTS 6,154,734 A * 11/2000 Bailey et al. ................ 705/410
6,199,046 B1 * 3/2001 Heinzle et al. ................ 705/1
6,721,715 B2 * 4/2004 Nemzow ..................... 705/26

FOREIGN PATENT DOCUMENTS

| DE | 19857499 | * | 12/1998 |
| EP | 0858037 | * | 1/1998 |
| EP | 0 999 511 | * | 5/2000 |
| WO | WO/97/07454 | * | 2/1997 |
| WO | WO99/06918 | * | 2/1999 |
| WO | WO 99/50776 | * | 10/1999 |

OTHER PUBLICATIONS

Sullivan, M., "Euro Conversions Seen as Trading-Floor Focus"; The Wall Street Journal; New York; Dec 28, 1998.*
Greene, C., "Here Comes the Euro", Commerical Lending Review; Boston; Fall 1998.*
"Managing Corporate Forex Exposure Before EMU"; Business Line; Islamabad; Nov 16, 1998.*
Introduction of the Euro: Key Events—http://www.ameue.org/publications/business/sme/english/sme_3.html.*
The Legal Framework of the Euro; 4.2 Regulations (EC) No. 974/98; http://db.consilium.eu.int/emu/policy_en/4/main2.html.*
The Legal Framework of the Euro; 4.1Regulations (EC) No. 1103/971; http://db.consilium.eu.int/emu/policy_en/4/main1.html.*

* cited by examiner

SOFTWARE ARCHITECTURE
ILLUSTRATIVE EMBODIMENT

METHOD AND APPARATUS FOR CONVERTING, FORMATTING, AND DISPLAYING CURRENCY VALUES

TECHNICAL FIELD

The present invention relates to computer systems for processing currencies. More specifically, the present invention relates to computer systems for converting, displaying, and formatting currency values. Even more particularly described, this invention relates to computer systems for converting between the euro and other currencies, and formatting and displaying the converted results.

BACKGROUND OF THE INVENTION

As part of the move to economically unify Europe, the European Union (EU) has created a common European currency called the "euro," which is represented by the € symbol. From Jan. 1, 1999 until July, 2002, the euro will be used concurrently with the national currencies of each of the Economic and Monetary Union (EMU) member countries for financial and business transactions. The EMU member countries are Belgium, Germany, Spain, France, Ireland, Italy, Luxemburg, the Netherlands, Austria, Portugal, and Finland. Although the euro will be used for financial and business transactions during the "dual currency period," euro currency will not actually be introduced into circulation until Jan. 1, 2002. Following the dual currency period, the euro will completely replace the national currencies of the EMU member countries for both circulating currency and transactional currency exchange.

During the dual currency period, individuals, businesses, banks, and other financial institutions in the EMU member countries will be required to operate and report in both the euro, and in their national trading currency. Therefore, these entities will be required to simultaneously deal with two currencies everyday for more than three years. Although dealing with two currencies simultaneously does not sound difficult in and of itself, several aspects of the euro may make handling two currencies in this manner very difficult. In particular, starting Jan. 1, 1999, the euro has fixed conversion rates against all of the national currencies (for instance, 1 euro=6.55957 French Francs (FRF)). These fixed conversion rates have six mandatory significant digits, and are therefore difficult to memorize and perform calculations with. Moreover, the EU has mandated specific currency conversion and rounding rules in an attempt to handle possible inaccuracies during conversion and to prevent fraudulent currency conversion operations. As a result of the conversion rates and the mandatory conversion rules, simultaneous operation with two currencies may be very difficult for all effected individuals and businesses.

To make matters worse, current computer systems are ill-equipped to support the euro and the conversion rates and rules that come along with it. In fact, because the € symbol was designed to specifically identify the euro, computer software upgrades are necessary just so computer systems can display and print the € symbol. Moreover, current computer application software is unable to convert between the euro and other currencies in an easy to use fashion, is unable to allow quick selection of a destination currency, and cannot provide convenient access to conversion results. Furthermore, because the EU did not make any recommendation with regard to the formatting of currency represented in euro, current computer applications are unable to format euro currency values in the format of the national currency.

Therefore, in light of these problems, there is a need for a method and apparatus for easily and quickly converting between the euro and other currencies that follows the EU-defined conversion rules. There is also a need for a method and apparatus for formatting the converted currency into the format of the appropriate national currency. There is an additional need for a method and apparatus for displaying the results of a currency conversion that will allow quick selection of the destination currency and provide convenient access to the conversion results.

SUMMARY OF THE INVENTION

The present invention solves the problems described above by providing a method and apparatus for easily and quickly converting between the euro and other currencies. The present invention also provides a method and apparatus for applying a euro formatting style to euro currency values. The present invention further provides a method and apparatus for displaying converted results that advantageously allows quick selection of the source and destination currencies and that provides convenient access to the conversion results.

Generally described, the present invention provides a method and system for converting between the euro and other currencies. The present invention also provides a method and system for formatting the results of a currency conversion in a user-modifiable euro currency style. The present invention further provides a method and system for converting between the euro and other currencies using a conversion wizard. The present invention also provides a method and system for displaying the results of a currency conversion.

More specifically described, the present invention provides a conversion function for converting between the euro and other currencies. The conversion function converts a value in a source type of currency to a value in a destination type of currency according to EU-specified conversion rules and rounding rules. The conversion function may optionally ignore the EU-specified rounding rules and return a full-precision converted value. The conversion function may also optionally convert the value utilizing a user-supplied number of significant digits.

The present invention also provides a method and apparatus for formatting the results of a conversion in a user-modifiable euro style. A formatting toolbar button is supplied that applies a euro formatting style to a selected currency value or range of values when selected. In order to apply the euro style, aspects of the euro style are obtained from a central location. The euro glyph is then placed in proximity to the selected value, the decimal point is adjusted, and the appearance of negative numbers may be adjusted. Optionally, decimal and character separator symbols may be obtained from a central location and applied to the value as a part of the euro style. The euro style may then be applied to the selected value, and the euro style may be saved for later use.

The present invention additionally provides a conversion wizard for converting a group of values between the euro and other currencies. The conversion wizard may accept a range of values or a range of source locations containing values or functions to be converted. The conversion wizard may also accept a range of destination locations to store the results of the conversion. The conversion wizard may also optionally accept user-specified options regarding how functions encountered in source locations should be converted. Functions may be converted to values only, new formulas may be linked to the original data, or the user may be prompted for formula handling options at the time a formula is encountered. The conversion wizard then converts the group of values according to the user-specified options.

The present invention also provides a toolbar for viewing the results of the currency conversion. The toolbar provides a floating window that indicates the value of a current location in a user-specified type of currency. The window is updated each time a new location or range of locations is selected, a refresh command is issued, or a new type of currency is selected.

In this manner, the present invention advantageously provides a method and apparatus for converting between the euro and other currencies, for formatting the converted results, and for conveniently displaying the converted results. That the present invention improves over the drawbacks of the prior art and accomplishes the objects of the invention will become apparent from the detailed description of the illustrative embodiment to follow.

DETAILED DESCRIPTION

Figure 1:
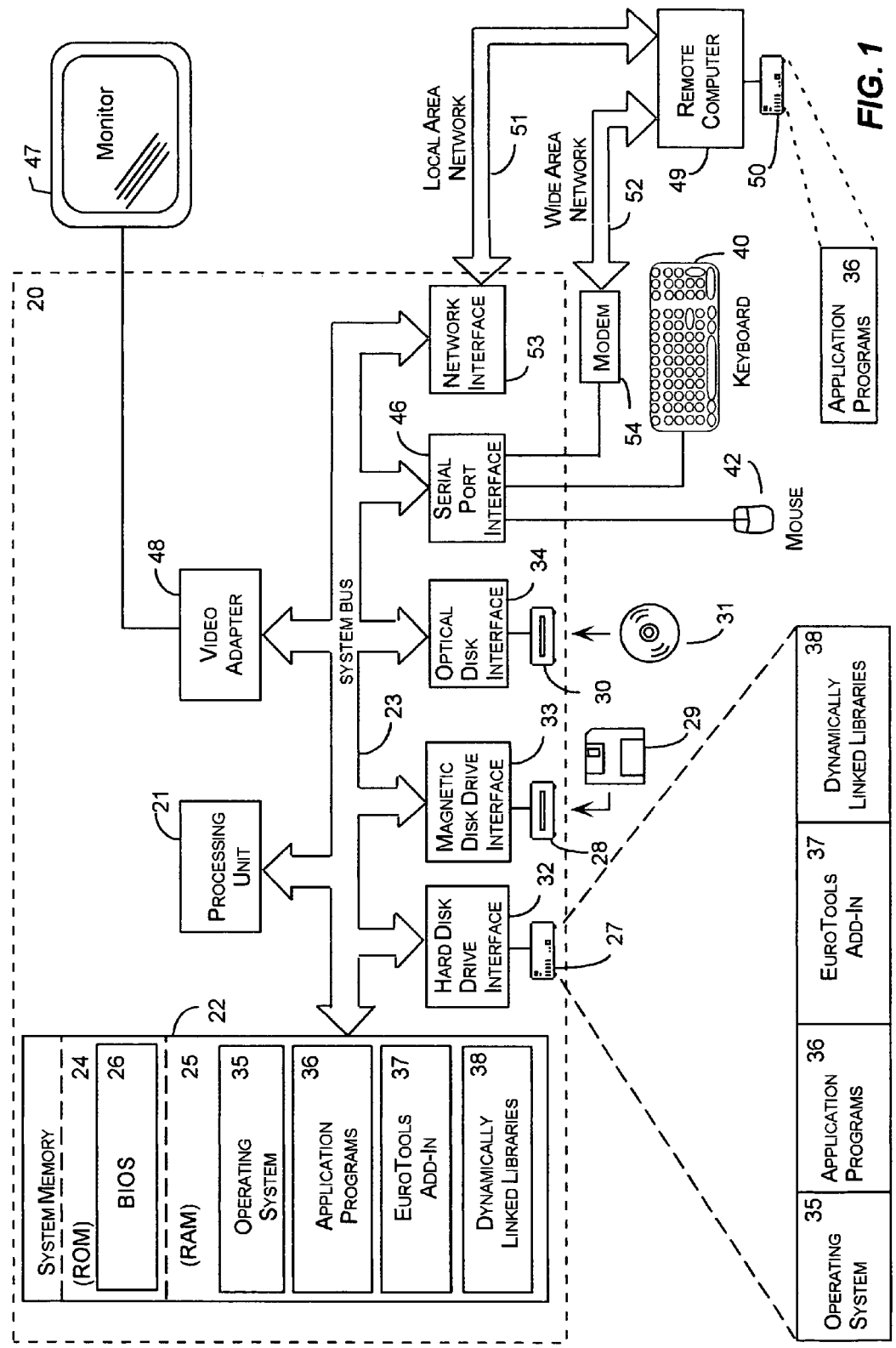
FIG. 1 is a block diagram of a networked personal computer that provides the operating environment for embodiments of the present invention.

The present invention is directed toward a method and apparatus for converting between the euro and other currencies, formatting the converted results, and displaying the converted results. The present invention may be embodied in an application program, in an operating system program that provides currency handling services, or in another type of program module. In an illustrative embodiment, the present invention is embodied in an add-in program module to a spreadsheet application program running on a personal computer.

In an illustrative embodiment of the present invention, a conversion function is provided for converting a value in a source currency to a value in a destination currency. The conversion function receives five arguments as input: a value in a source type of currency to be converted, or the location where the value in the source type of currency may be located, such as a spreadsheet cell reference, the identity of the source type of currency from which the value is to be converted, the identity of the destination type of currency that the value is to be converted to, a full-precision flag, and a triangulation value. The five input arguments may be received by the conversion function in conjunction with a request to convert the value in the source type of currency to the value in the destination type of currency.

Once a request to perform a currency conversion has been received, the conversion function retrieves the value in the source currency from the specified source location. If no location was provided, the conversion function uses the provided value as the value in the source currency to be converted. The conversion function then applies a set of predefined conversion rules to convert the value in the source type of currency to a value in the destination type of currency. The predefined conversion rules may be the EU-specified euro conversion rules, including currency conversion factors, may be a subset or superset of those rules, or may be another set of conversion rules altogether as are known to those skilled in the art.

The conversion function may also examine the triangulation precision value to determine if triangulation precision should be applied during the conversion process. The EU mandates that when converting between national currencies, the source currency must first be converted to an intermediate value in euro. The intermediate value may then be converted to the destination type of currency. The intermediate value may be truncated to no less than three digits. If the conversion function determines that a triangulation precision result should be returned, therefore, the conversion function may truncate the intermediate value to a predefined or user-selected number of significant digits.

Once the conversion has been completed, the conversion function may examine the full-precision flag to determine whether the value in the destination currency should be returned as a full precision result. If the full-precision flag is set, the conversion function will ignore any currency-specific rounding rules and return a value having unlimited digits based upon mathematical result. If the conversion function determines that a full-precision result should be returned, the conversion function may save the converted value in the destination currency in a new location as a full-precision result. If it is determined that the conversion results should not be returned as a fill-precision result, predefined rounding rules associated with the destination currency may be applied to the value in the destination currency, and the result may be saved in a new location. The predefined currency rounding rules may be EU-specified rounding rules associated with each type of currency, or may be other currency rounding rules known to those skilled in the art.

In another illustrative embodiment of the present invention, a euro style formatting button is displayed on a graphical user interface. In response to user input selecting the euro style formatting button, a user-modifiable euro style format is applied to a selected currency value or range of values.

More particularly described, the euro style format is applied to a selected currency value by first determining whether the user has selected the euro style formatting button. If the user has selected the euro style formatting button, a current currency style is obtained from a central location, such as a spreadsheet workbook. The current currency style contains a default currency symbol, for instance a "$" symbol for U.S. users, and describes whether the default currency symbol should be placed to the left or to the right of currency values. The euro currency symbol, or glyph, is then retrieved from another central location, such as a unicode character set.

Once the euro currency symbol has been retrieved, it is then placed on the same side of the selected currency value as the default currency symbol. Next, the location of a decimal separator symbol, such as a ".", is adjusted so that the selected currency value shows two decimal digits. The location of a negative symbol for negative numbers is also adjusted. If the euro currency symbol is placed before the selected value, the negative symbol comes before the euro currency symbol (for example, -€100.00). If the euro currency symbol is placed after the selected value, the negative symbol is placed before the selected value (for example, -100.00 €). Optionally, a decimal separator symbol and a thousands separator symbol may also be retrieved from a central location, such as a regional settings control panel. The decimal and thousands separators may then be inserted into the selected value to customize the euro style even further. If the euro style is applied to a range of values, the above procedure is applied to each value in the range so that each value reflects the euro style format. The euro currency symbol and its location, the decimal and thousands separators, and the position of the negative sign may all be saved as a euro style for later use.

According to another illustrative embodiment of the present invention, a conversion wizard is provided for converting ranges of source locations from a source type of currency to a destination type of currency. The conversion wizard advantageously permits the selection of a source range of locations, a destination range of locations, a source type of currency, and a destination type of currency. When the conversion wizard is executed, the values contained in the source range of locations are converted from the source type of currency to the destination type of currency, and stored in the destination range of locations. An output style format may also be selected that is applied to the converted results that are stored in the destination range of locations. In this manner, a euro style format, as described above, or other style format, may be applied to the results of the conversion.

The conversion wizard also permits the selection of advanced options relating to the handling of formulas contained in the source locations and relating to the number of significant digits used in the conversion process. With regard to the selection of the type of rounding used in the conversion process, the conversion wizard permits the selection of a full-precision conversion with no follow-on rounding, or a triangulation precision conversion with truncation of the intermediate result to a user-specified number of significant digits. If a full-precision conversion is not selected, currency specific rounding rules, such as those provided by the EU, will be applied to the results of the conversion process.

With regard to the selection of options relating to the handling of formulas encountered in source locations during the conversion process, the conversion wizard permits the user to select that the formulas located in the source range should be converted to values only and stored in the destination range, that the user should be prompted each time a formula is encountered, or that converted formulas should be copied to the destination range and that the source range remain unmodified.

If the user selects that a prompt should be provided each time a formula is encountered, the conversion wizard will request user input regarding how the formula should be handled each time a formula is encountered in a source location. The user may indicate that the formula should be converted to a value and stored in the destination location, that the formula should be copied to the destination location but not modified, that the destination location should be left blank, or that converted formulas should be copied to the destination range and that the source range remain unmodified. The user may also be permitted to edit or otherwise modify the formula contained in the source location, which may then be saved in the destination location. The user may also indicate that the selection be applied to all subsequent formulas encountered in source locations. In this manner, the conversion wizard can easily and effectively convert formulas contained in source locations.

According to another aspect of the present invention, a EuroView toolbar is provided for quickly and conveniently accessing the results of a currency conversion and for selecting new conversion factors. A dialog box is provided that contains a drop-down menu comprising all of the available currency conversion factors. The user may select any of the available currency conversion factors using an input selection device. In response to the selection of one of the available currency conversion factors, the EuroView toolbar converts a value in a currently selected location from a source type of currency to a destination type of currency according to the selected conversion factor, and displays the results of the currency conversion in the EuroView toolbar. The displayed conversion results may also be updated in response to the selection of a new source location, in response to selecting a "recalculate" function, or in response to the selection of a range of source locations. If a range of source locations is selected, the values contained in the source locations are added, the result is then converted according to the selected conversion factor, and the results of the conversion are displayed in the EuroView toolbar.

Illustrative Operating Environment

Although the illustrative embodiment will be generally described in the context of an add-in program module to a spreadsheet application program running on a personal computer, those skilled in the art will recognize that the present invention may be implemented in conjunction with operating system programs or with other types of program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client server manner. Examples of such distributed computing environments include local area networks and the Internet.

The detailed description that follows is represented largely in terms of processes and symbolic representations of operations by conventional computer components, including a processing unit (a processor), memory storage devices, connected display devices, and input devices. Furthermore, these processes and operations may utilize conventional computer components in a heterogeneous distributed computing environment, including remote file servers, compute servers, and memory storage devices. Each of these conventional distributed computing components is accessible by the processor via a communication network.

The processes and operations performed by the computer include the manipulation of signals by a processor and the maintenance of these signals within data structures resident in one or more memory storage devices. For the purposes of this discussion, a process is generally conceived to be a sequence of computer-executed steps leading to a desired result. These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read-only memory.

Referring now to the drawings, in which like numerals represent like elements throughout the several figures, aspects of the present invention and the illustrative operating environment will be described.

FIG. 1 and the following discussion are intended to provide a brief, general description of a suitable computing environment in which the invention may be implemented. Referring now to FIG. 1, an illustrative environment for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media are readable by a computer, such as magnetic cassettes, flash memory cards, digital video disks, Bernoulli cartridges, and the like, may also be used in the illustrative operating environment.

A number of program modules may be stored in the drives and RAM 25, including an operating system 35 and one or more application programs 36, such as a spreadsheet program In the illustrative embodiment of the present invention, aspects of the present invention may also be stored in RAM 25 as EuroTools Add-In program module 37 and dynamically linked libraries 38. Aspects of the present invention may be incorporated directly into a spreadsheet application program, or EuroTools Add-In program module 37 may be utilized in conjunction with an application program 36, such as a spreadsheet application program, to provide euro-handling functionality. Likewise, dynamically linked libraries 38 may embody aspects of the present invention and may be executed by applications program 36 to provide euro-handling capability to a wide range of programs, including word processors, world wide web browsers, and other applications apparent to those skilled in the art.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers. The personal computer 20 may be capable of displaying a graphical user interface on monitor 47.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are illustrative and other means of establishing a communications link between the computers may be used.

As discussed earlier, the illustrative embodiments of the present invention are embodied in an add-in program module for use with a spreadsheet application program, or within an operating system that provides currency handling services. The operating system 35 generally controls the operation of the previously discussed personal computer 20, including input/output operations. In the illustrative operating environment, the invention is used in conjunction with Microsoft Corporation's "Windows 98" operating system. However, it should be understood that the invention can be implemented for use in other operating systems, such as Microsoft Corporation's "WINDOWS 3.1," "WINDOWS 95", "WINDOWS NT" and "WINDOWS 2000" operating systems, IBM Corporation's "OS/2" and "AIX" operating systems, SunSoft's "SOLARIS" operating system used in workstations manufactured by Sun Microsystems, Hewlett-Packard's "HP-UX"

and "RT-UX" operating systems, and the operating systems used in "MACINTOSH" computers manufactured by Apple Computer, Inc.

Illustrative Embodiments of the Present Invention

Figure 2:
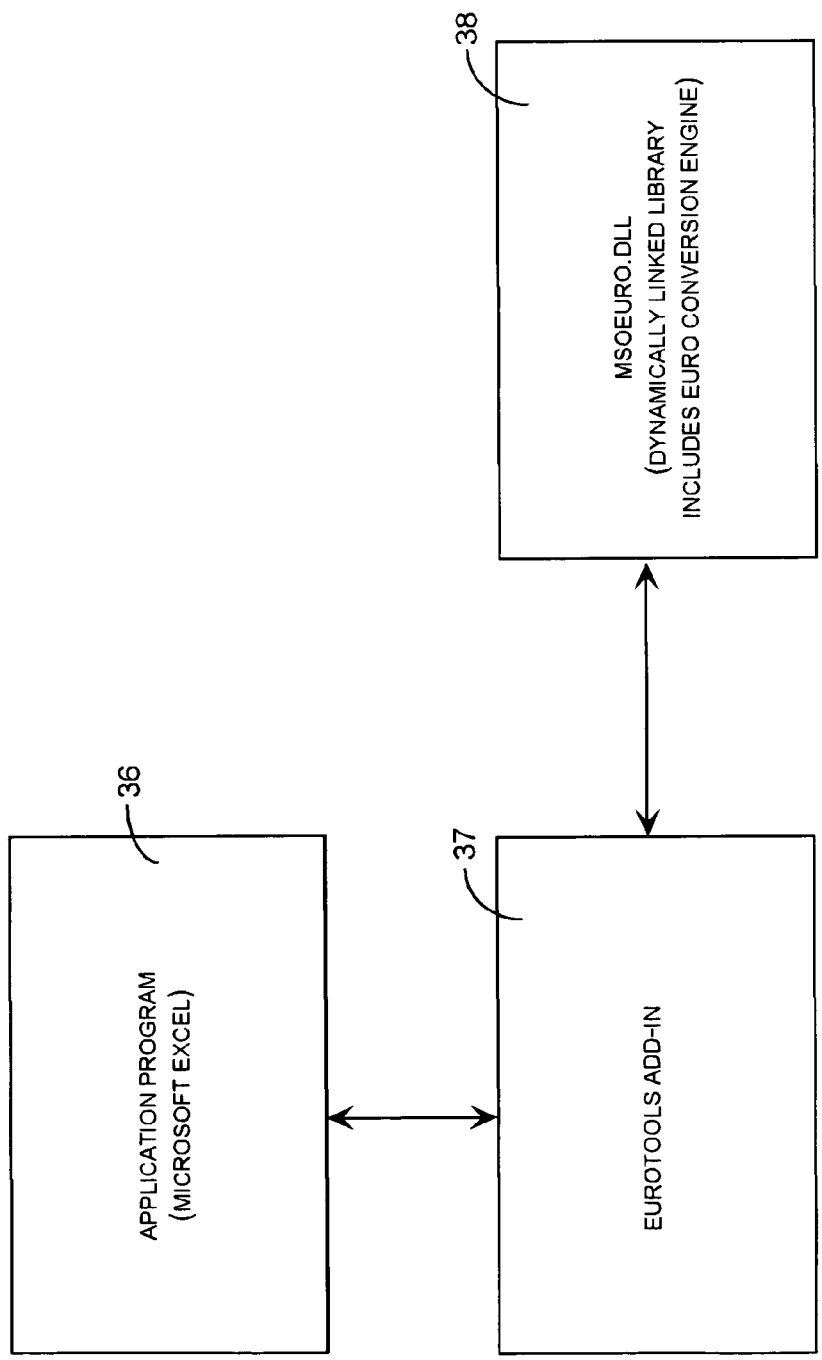
FIG. 2 is block diagram illustrating the software architecture of an embodiment of the present invention.
Figure 3:
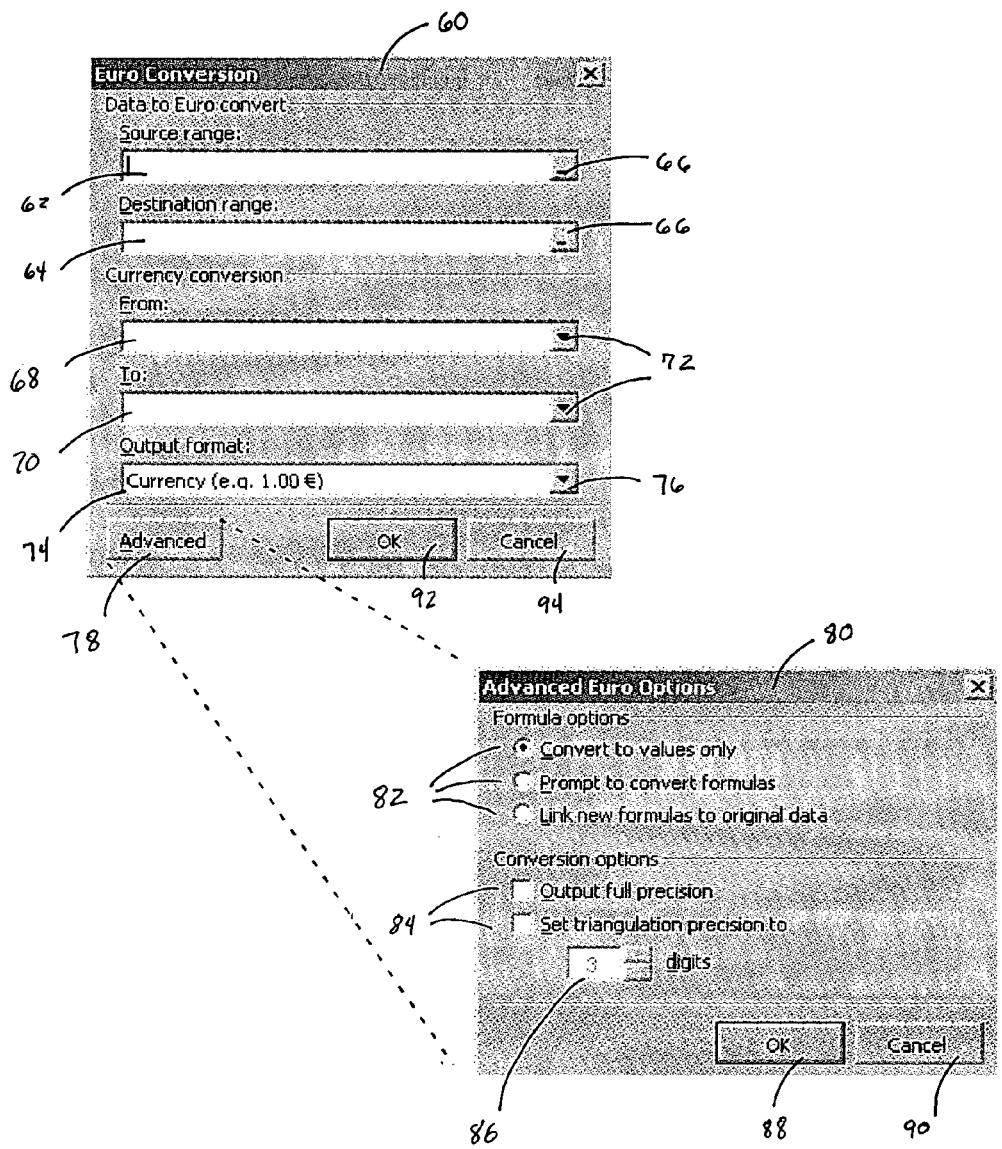
FIG. 3 is a screen shot of a software application program that embodies aspects of the present invention.
Figure 4:
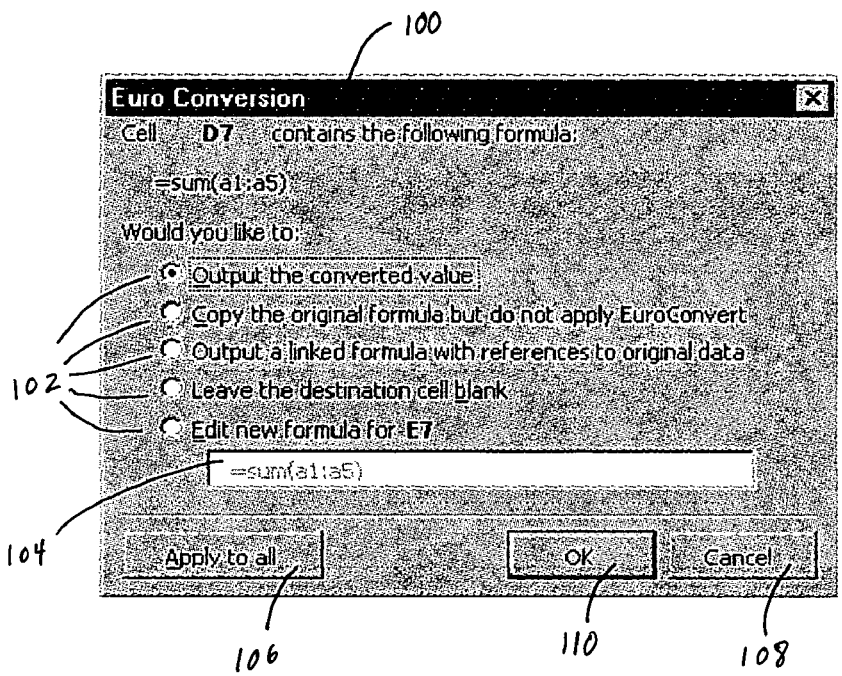
FIG. 4 is a screen shot of a software application program that embodies aspects of the present invention.
Figure 5:
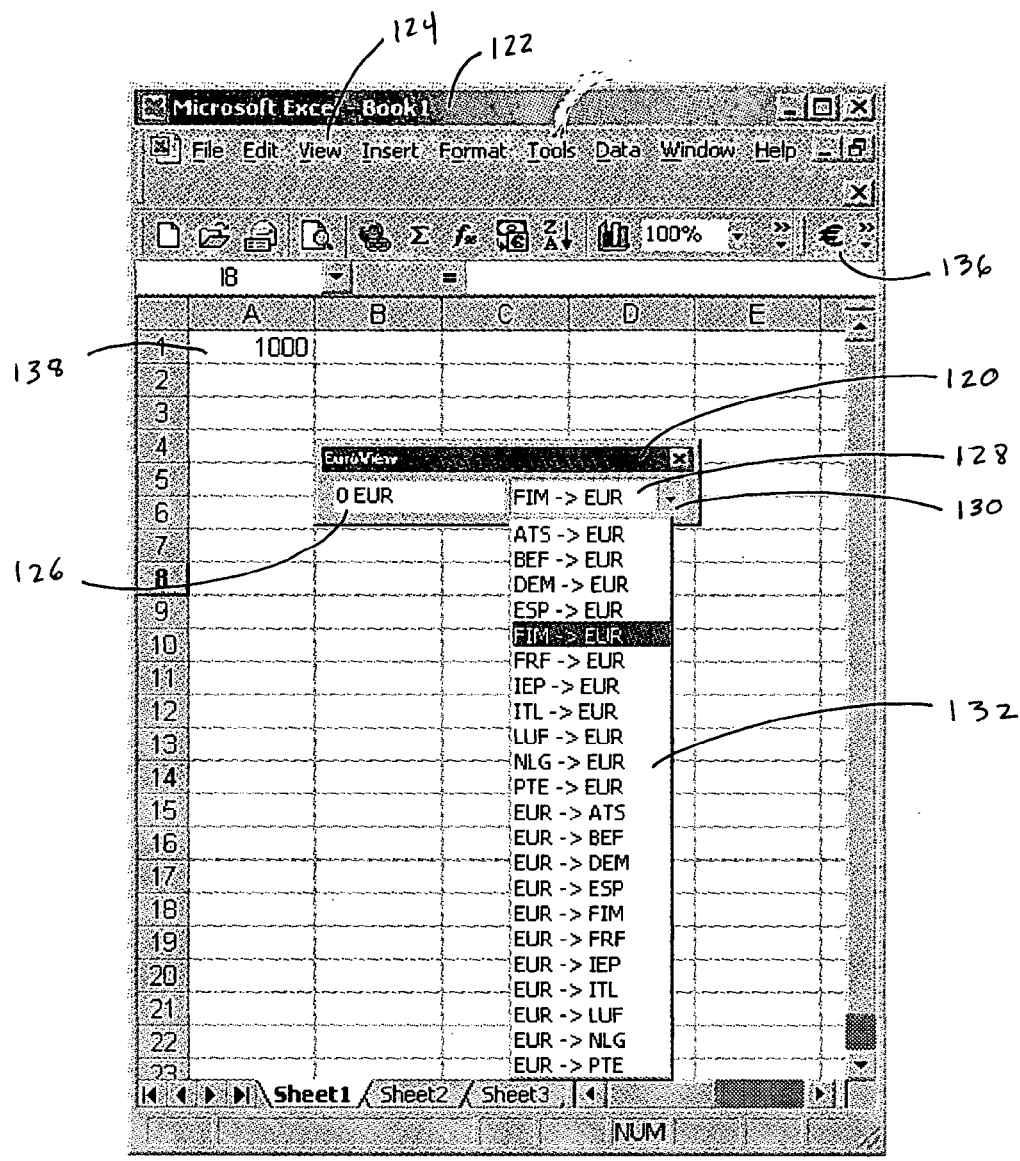
FIG. 5 is a screen shot of a software application program, including a EuroView toolbar, that embodies aspects of the present invention.

With the above preface on the illustrative operating environment for embodiments of the present invention, the remaining FIGS. 2-10 illustrate aspects of several embodiments of the present invention. FIG. 2 is block diagram illustrating the software architecture of an embodiment of the present invention. FIGS. 3-5 are screen shots of a software application program that embodies aspects of the present invention. FIGS. 6-10 are flow diagrams illustrating exemplary methods for converting between currencies, for applying style formatting to euro currency values using a formatting toolbar button, for converting between national currencies and euros using a conversion wizard, and for displaying converted currency values using a EuroView toolbar.

Referring now to FIG. 2, a software architecture for an illustrative embodiment of the invention will be described. The EuroTools Add-In program module 37 is utilized in conjunction with an application program 36, such as Microsoft Corporations "EXCEL" spreadsheet application program. The EuroTools Add-In program module 37 embodies aspects of the present invention, and also provides access to other aspects of the present invention embodied in dynamically linked libraries 38. In particular, in an illustrative embodiment, dynamically linked libraries 38 include routines for converting between the euro and other national currencies. In this manner, the EuroTools Add-In program module 37 may access the conversion routines located in dynamically linked libraries 38 for converting between the euro and other currencies. Likewise, the conversion routines located in dynamically linked libraries 38 may be "shared" so that other application programs, such as a word processor, financial calculator, world wide web browser (not shown) and the like, may provide euro conversion, formatting, and display functionality.

Referring now to FIG. 3, an illustrative user interface will be described for converting between currencies using a conversion wizard. An illustrative method for converting between currencies using a conversion wizard will be described more fully in connection with FIGS. 8A and 8B, below. With regard to the user interface, a euro conversion dialog box 60 is displayed in response to a user command to perform a currency conversion upon a value or range of values. As is well know to those skilled in the art, the user command may comprise a mouse click on a toolbar button, a command key sequence, a selection of a pull down menu, or any other command procedure known to those skilled in the art. In the euro conversion dialog box 60, the user is prompted to enter several values and options prior to the conversion of the values. In particular, the user is prompted to enter a source range 62 for conversion, and a destination range 64 where the results of the conversion should be stored. In an illustrative embodiment, the source range 62 and destination range 64 comprise cells or cell ranges in a spreadsheet that may be selected in response to the selection of range selector buttons 66. However, it should be apparent to those skilled in the art that source range 62 and destination range 64 may comprise the actual values to be converted, or other types of locations known to those skilled in the art.

The euro conversion dialog box 60 also requires the selection of the source type of currency 68 that the source range 62 should be converted from, and the destination type of currency 70 that the source range 62 should be converted to. In response to the selection of selector buttons 72, a drop-down menu (not shown) may be displayed showing the valid types of currency that may be selected. In this manner, the user may easily select the source type of currency 68 and the destination type of currency 70. Likewise, the user may also select an output format 74 to be applied to the results of the conversion. As described above, the output style format 74 may define the appearance of the results of the conversion, including the location of the euro glyph, the decimal separator symbol, the thousands separator symbol, and the like. Selection of the output style format 74 may be facilitated by the user of selector button 76 that displays a drop-down menu (not shown) of the available output style formats.

Selection by the user of the advanced button 78 at any time while the euro conversion dialog box 60 is active will present the user with the advanced euro options dialog box 80. The user is then requested to make a number of selections regarding the details of the conversion process. In particular, by selecting one of radio buttons 82, the user may indicate how formulas encountered in source range 62 should be handled. The user may indicate that the formulas in source range 62 should be converted to values only and stored in destination range 64, that the user should be prompted each time a formula is encountered (discussed below with reference to FIG. 4), or that converted formulas be copied to the destination range 64 and that the source range 62 remain unmodified. These options are discussed in greater detail below with reference to FIG. 9.

The advanced euro options dialog box 80 also permits the user to select whether a full precision result will be returned and whether the intermediate result will be truncated using triangulation precision by selecting check boxes 84. If fill precision is selected, the conversion process will utilize six significant digits during the conversion, and no follow-up rounding will be applied to the result. If triangulation precision is selected, the intermediate result will be truncated to the number of significant digits selected by the user in selection box 86 during the conversion. If the user selects the "OK" button 88, the selected options are saved for use during the conversion process. If the user selects the "CANCEL" button 90, any changes made in the advanced euro options dialog box 80 are discarded. Likewise, if the user selects the "CANCEL" button 94, the conversion does not occur and the euro conversion dialog box 60 is removed. If the user selects the "OK" button 92, the values or functions in the source range 62 are converted from the source type of currency 68 to the destination type of currency 70, and stored in the destination range 63 in the output style format 74. The conversion process is discussed in detail below with respect to FIGS. 6-9.

As described above, the user may indicate that a prompt be provided each time a formula is encountered in source range 62. Referring now to FIGS. 3 and 4, the formula handling dialog box 100 illustrates an illustrative prompt that may be displayed when a formula is encountered in source range 62. Formula handling dialog box 100 indicates that a cell in source range 62 contains a formula, and requests that the user provide instructions regarding how the formula should be handled using radio buttons 102. The user may select that the formula be converted and the results stored in destination range 64, that the formula be copied to destination range 64 without conversion, that a converted formula be copied to destination range 64 without modification of the source range 62, or that the destination range 64 be left blank. The user may also edit the new formula for destination range 64 using the edit box 104. Each of these options is discussed in greater detail below with respect to FIG. 9.

Once the user has indicated how the formula in source range 62 should be handled, the user may select "APPLY TO ALL" button 106 and any subsequent formulas encountered in source range 62 will be handled in the manner selected by the user with radio buttons 102. The user may also select "CANCEL" button 108 to abort processing of the function, or may select "OK" button 110 to process the function in the manner indicated.

Referring now to FIG. 5, a EuroView toolbar 120 is illustrated in the context of a spreadsheet application program 122. In an illustrative embodiment, the EuroView toolbar 120 is displayed in response to a user selection under the "VIEW" menu option 124. In its enabled state, the EuroView toolbar 120 is displayed over the application program and provides quick access to conversion results and conversion factors. In particular, the EuroView toolbar 120 displays a drop-down conversion options list 132 in response to the user selection of selection button 130. In an illustrative embodiment, conversion options list 132 allows quick selection of conversion factors between the euro and the 11 national currencies. It should be apparent to those skilled in the art that other conversion factors could be listed in conversion options list 132.

In response to the display of conversion options list 132, a user may select one of the available conversion factors. For instance, conversion factor "EUR->FRF" signifies conversion between a euro (EUR) type of source currency and a French francs (FRF) type of destination currency and selects the appropriate conversion factor. Once a conversion factor has been selected, the conversion options list 132 is removed, and the currently selected conversion factor is displayed in conversion factor window 128.

While the EuroView toolbar 120 is active, the currently selected cell, such as cell 138, will be converted according to the currently selected conversion factor, and the result will be displayed in window 126. In this manner, a user can easily and quickly obtain the results of a currency conversion. When the user selects a new cell, the value in window 126 is updated to reflect the conversion of the value contained in the new cell. If a range of cells are selected, the value in window 126 will display the converted sum of the range of cells. If text cells are selected, the value in window 126 will be blank. Also shown in FIG. 5 is the euro style toolbar button 136 that will apply a euro style to a selected cell or range of cells in response to a user selection. Selection and application of the euro formatting style is described in more detail below with reference to FIG. 7.

Figure 6:
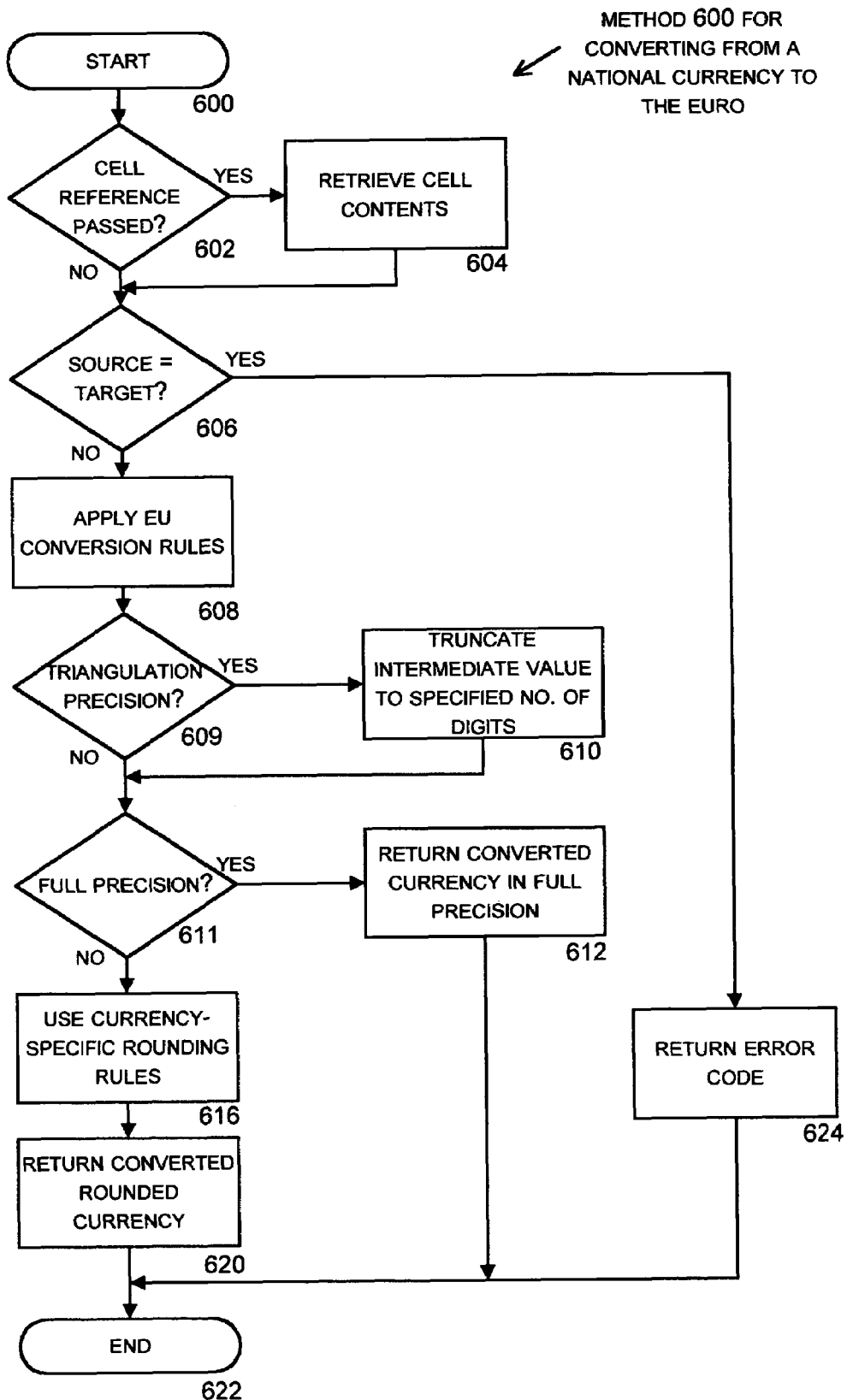
FIG. 6 is a flow diagram that illustrates an exemplary method for converting between currencies.

Referring now to FIG. 6, a method 600 for converting between currencies will be described. Method 600 begins at step 602, where a determination is made as to whether a cell reference was passed with the request to perform a currency conversion. If a cell reference was not passed, the method 600 continues to step 606. If a cell reference was passed, the method 600 branches to step 604, where the contents of the referenced cell are retrieved. From step 604, the method continues to step 606.

At step 606, a determination is made as to whether the source type of currency is the same as the destination type of currency. If the source type of currency and the destination type of currency are the same, there is no need to convert between the two. Therefore, if the source and destination types of currency are the same, the method 600 branches to step 624, where an error code is returned. From step 624, the method 600 continues to step 622, where it ends. If the source and destination types of currency are not the same, the method continues from step 606 to step 608.

At step 608, the method 600 applies conversion rules to convert the value in the source type of currency to a value in the destination type of currency. In an illustrative embodiment, the conversion rules are those rules prescribed by the EU for converting between the euro and other currencies. However, as will be apparent to those skilled in the art, the conversion rules may be a subset of the EU rules, may be a superset of the EU rules, or may be an entirely different set of conversion rules known to those skilled in the art.

From step 608, the method 600 continues to step 609, where a determination is made as to whether triangulation precision should be used during the conversion process. If triangulation precision is to be used, the method 600 branches to step 610, where the intermediate value in the conversion is truncated to a predefined or user-specified number of significant digits. The method 600 then continues from step 610 to step 611. If triangulation precision is not to be used during the conversion process, the method 600 continues from step 609 to step 611.

From step 609, the method 600 continues to step 611, where a determination is made as to whether a full precision result should be returned. If a full precision result is to be returned, the method 600 branches to step 612, where the result of the conversion is returned with unlimited significant digits. From step 612, the method 600 continues to step 622, where it ends. If a full-precision result is not to be returned, the method 600 continues from step 611 to step 616.

At step 616, the result of the conversion is rounded using currency-specific rounding rules. In an illustrative embodiment, the rounding rules are those prescribed by the EU for rounding results of a conversion between the euro and the 11 national currencies. However, as will be apparent to those skilled in the art, other types of rounding rules may be utilized. The method continues from step 616 to step 620, where the converted, rounded results of the currency conversion are returned, or stored in a memory location. The method 600 ends at step 622.

Figure 7:
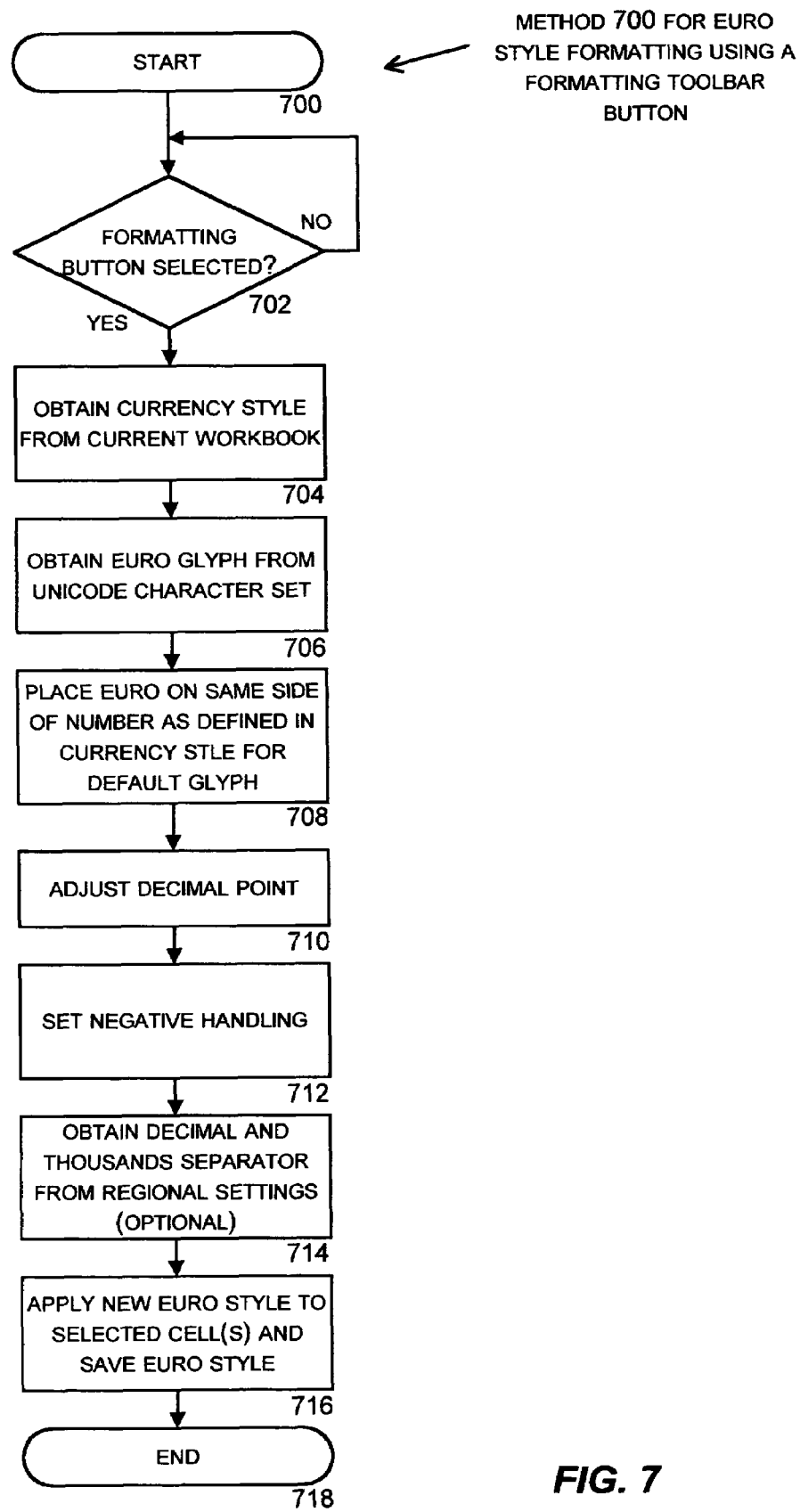
FIG. 7 is a flow diagram illustrating an exemplary method for applying style formatting to euro currency values using a formatting toolbar button.

Referring now to FIG. 7, an illustrative method 700 for euro style formatting using a euro style toolbar button will be described. The method 700 begins at step 702, where a determination is made as to whether a euro style toolbar button 136 (illustrated in FIG. 5) has been selected. If the euro style toolbar button 136 has not been selected, the method 700 returns to step 702 where another determination is made as to whether the euro style toolbar button 136 has been selected. Once the euro style toolbar button 136 has been selected, the method 700 continues to step 704.

At step 704, the current currency style is obtained from a central location, such as the current spreadsheet workbook. The current currency style includes a default currency symbol and also describes whether the default currency symbol should be placed to the left or to the right of currency values. From step 704, the method 700 continues to step 706, where the euro currency symbol, or glyph, is retrieved from a common location, such as a unicode character set.

The method 700 continues from step 706 to step 708, where the euro currency symbol is placed on the same side of a selected currency value as the default currency symbol. For instance, if the default currency symbol is a "$" and is placed on the left side of a currency value, then the euro currency symbol is placed on the left side of the selected currency value. If the default currency symbol is a "£" and is placed on the right side of a currency value in the default style, then the euro currency symbol is placed on the right side of the selected currency value.

Once the euro currency symbol has been placed in the proper location, the method 700 continues from step 708 to step 710. At step 710, the location of a decimal separator symbol, such as a ".", is adjusted so that the selected currency value shows two decimal digits. The method 700 then continues to step 712.

At step 712, the location of a negative symbol for negative numbers is also adjusted. If the euro currency symbol is placed before the selected value, the negative symbol comes before the euro currency symbol (for example, -€100.00). If the euro currency symbol is placed after the selected value, the negative symbol is placed before the selected value (for example, -100.00 €). The method 700 then continues from step 712 to 714, where a decimal separator symbol and a thousands separator symbol may optionally be retrieved from a central location, such as a regional settings control panel. The decimal and thousands separators may then be inserted into the selected currency value to further customize the euro style. The method 700 then continues from step 714 to step 716.

At step 716, the euro style, including the location of the euro currency symbol, the location of the negative sign, and the decimal and thousands separators, is applied to the selected currency value. It should be apparent to those skilled in the art that the euro style may also be saved for future use, and may also be applied to a range of selected values, or cells. If the euro style is applied to a range of values, the above procedure is applied to each value so that each value reflects the euro style format. The method 700 ends at step 718.

Figure 8A:
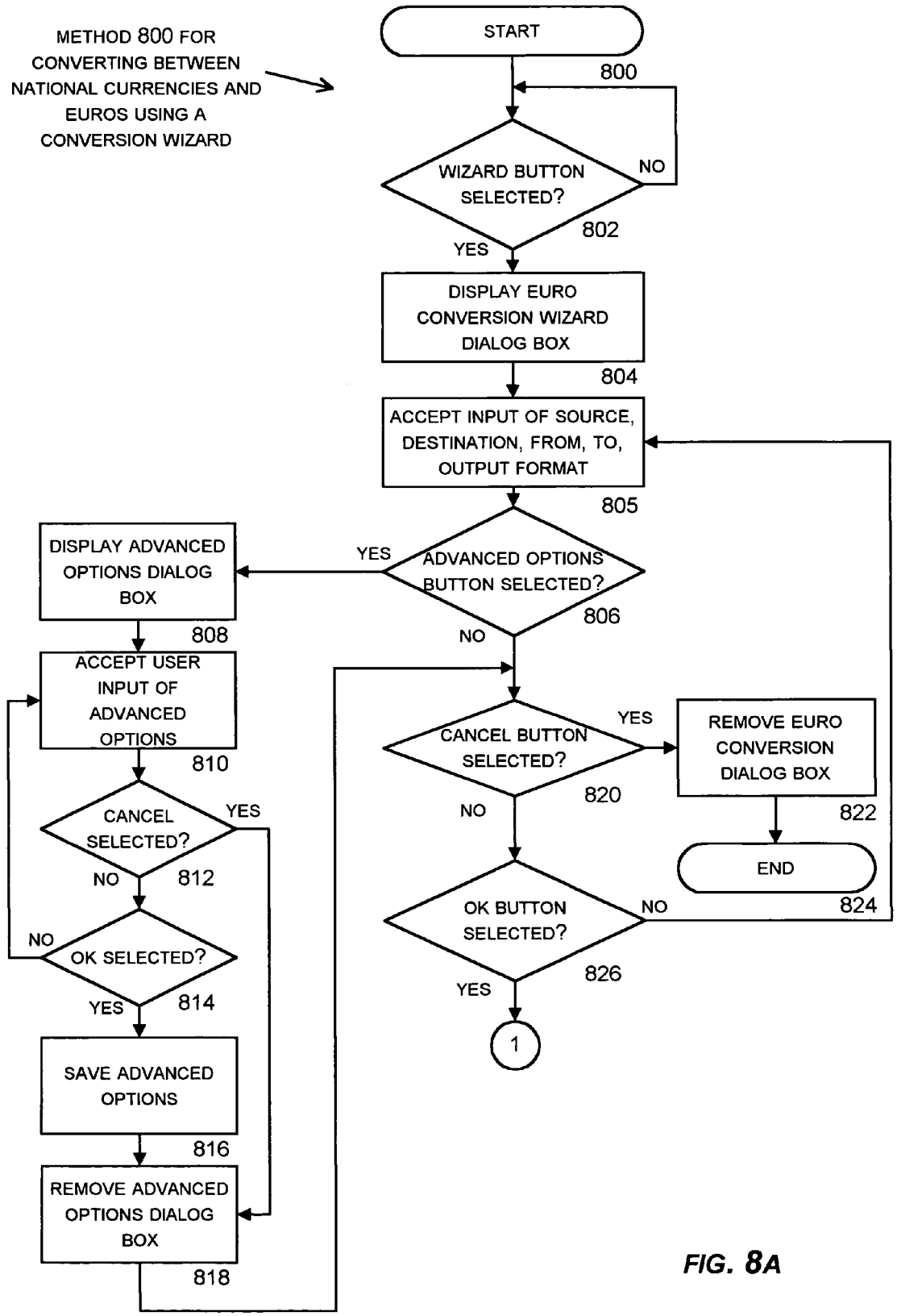
FIGS. 8A and 8B are flow diagrams illustrating an exemplary method for converting between national currencies and euros using a conversion wizard.
Figure 8B:
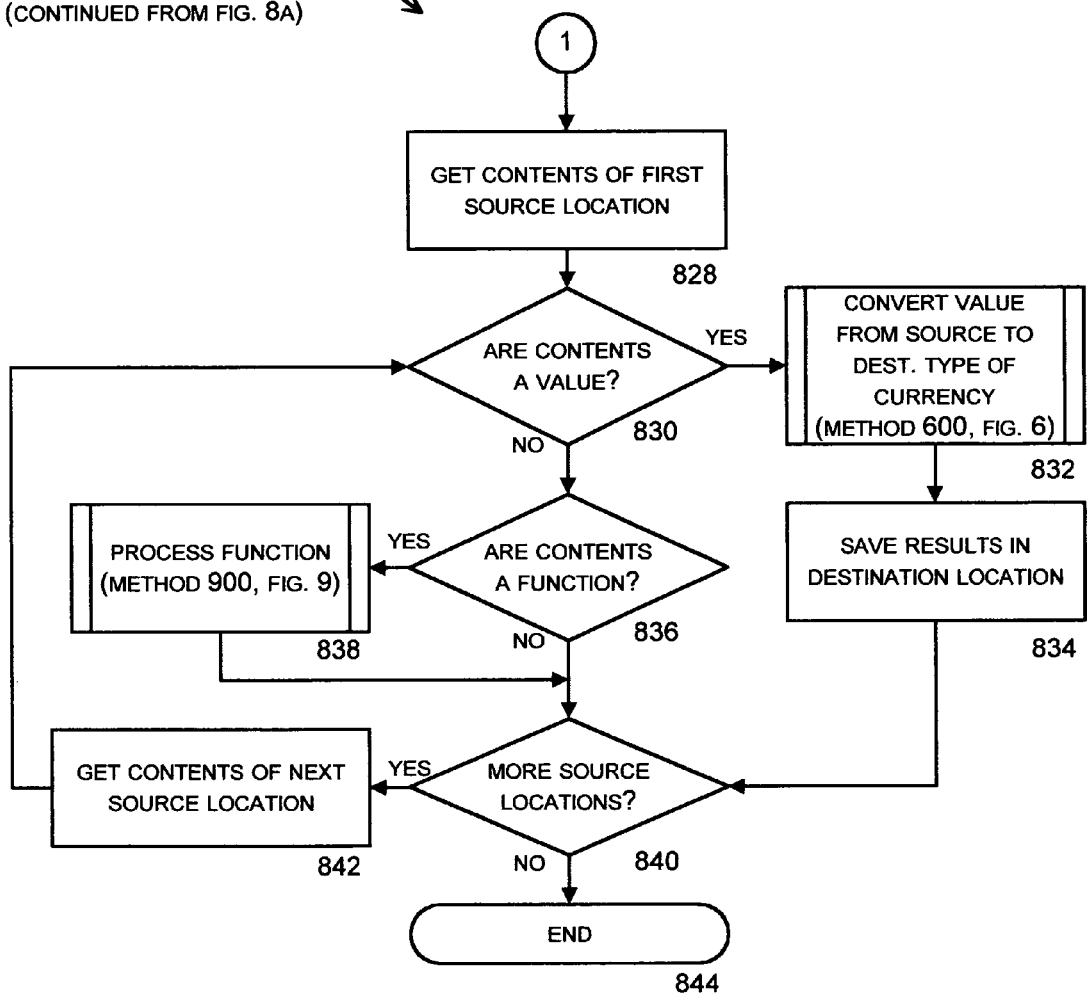

Referring now to FIGS. 8A and 8B, a method 800 for converting between currencies using a conversion wizard will be described. The method 800 begins at step 802, where a determination is made as to whether a conversion wizard user interface button has been selected. Those skilled in the art will appreciate that the conversion wizard may be initiated through means other than a user interface button, including a menu selection and the like. If the conversion wizard user interface button has not been selected, the routine 700 returns to step 702 where another determination is made regarding selection of the user interface button. If the conversion wizard user interface button has been selected, the method 800 continues to step 804, where a conversion wizard dialog box is displayed on the user interface. An illustrative conversion wizard dialog box is illustrated in FIG. 3, however, it should be appreciated that a variety of suitable dialog boxes may be utilized.

From step 804, the method 800 continues to step 805, where input is received identifying a range of source locations to be converted and a range of destination locations where the converted results are to be stored. Also received at step 805 is the identity of the source type of currency and the identity of the destination type of currency. An output style format, including a euro style, may also be received at step 805 for formatting the results of the conversion.

From step 805, the method 800 continues to step 806, where a determination is made as to whether an advanced options user interface button has been selected. In an illustrative embodiment, the advanced options user interface button is displayed on the conversion wizard dialog box. If the advanced options user interface button has been selected, the method 800 branches to step 808, otherwise the method 800 continues to step 820.

At step 808, an advanced euro options dialog box is displayed that permits a user to select options regarding the handling of formulas located in source locations and regarding the number of significant digits to be used in the conversion process. As discussed above with respect to FIG. 5, the user may indicate how formulas encountered in the source range should be handled. The user may indicate that the formulas in source range should be converted to values only and stored in destination range, that the user should be prompted each time a formula is encountered, or that converted formulas be copied to the destination range and that the source range remain unmodified. The advanced euro options dialog box also permits the user to select whether a full-precision result should be returned or whether triangulation precision should be utilized to truncate the intermediate result. If full precision is selected, the conversion process will utilize six significant digits during the conversion, and no follow-up rounding will be applied to the result. If triangulation precision is selected, the conversion process will truncate the intermediate conversion result to the number of significant digits selected by the user during the conversion.

From step 808, the method 800 continues to step 810, where user input of the advanced options described above is accepted. From step 810, the method 800 continues to step 812, where a determination is made as to whether a "CANCEL" button has been selected to abort the conversion operation. If a "CANCEL" button has been selected, the method 800 branches to step 816, where the advanced euro options dialog box is removed. If a "CANCEL" button has not been selected, the method 800 continues to step 814 where a determination is made as to whether an "OK" button has been selected. If an "OK" button has not been selected at step 814, the method 800 returns to step 810 where the user may input advanced options. If an "OK" button has been selected at step 814, the method 800 continues to step 816, where the selected advanced options are saved. The advanced options relating to formula handling may be saved as a user-specified formula handling rule for use during the conversion process. The advanced euro options dialog box is removed at step 818, and the method continues to step 820.

At step 820, a determination is made as to whether the cancel button on the euro conversion wizard dialog box has been selected. If a "CANCEL" button has been selected, the method 800 branches to step 822, where the euro conversion wizard dialog box is removed. The method 800 then ends at step 824. If a "CANCEL" button has not been selected, the method 800 continues to step 826, where a determination is made as to whether the "OK" button on the euro conversion wizard dialog box has been selected. If the "OK" button has not been selected, the method 800 branches to step 805, where input is accepted as described above. If the "OK" button is selected at step 826, the method 800 continues to step 828 (located at connector (1) on FIG. 8B).

At step 828, the contents of one of the source locations is retrieved, such as the contents of a cell of a spreadsheet. Step 828 continues to step 830, where a determination is made as to whether the contents of the source location contains a value. If the contents of the source location is a value, the method 800 branches to step 832, where the value is converted according to pre-defined currency conversion rules. In an illustrative embodiment, the value is converted utilizing the method 600 illustrated in FIG. 6 for converting currencies. At step 834, the results of the currency conversion are saved in one of the destination locations. The method 800 then continues to step 824.

Figure 9:
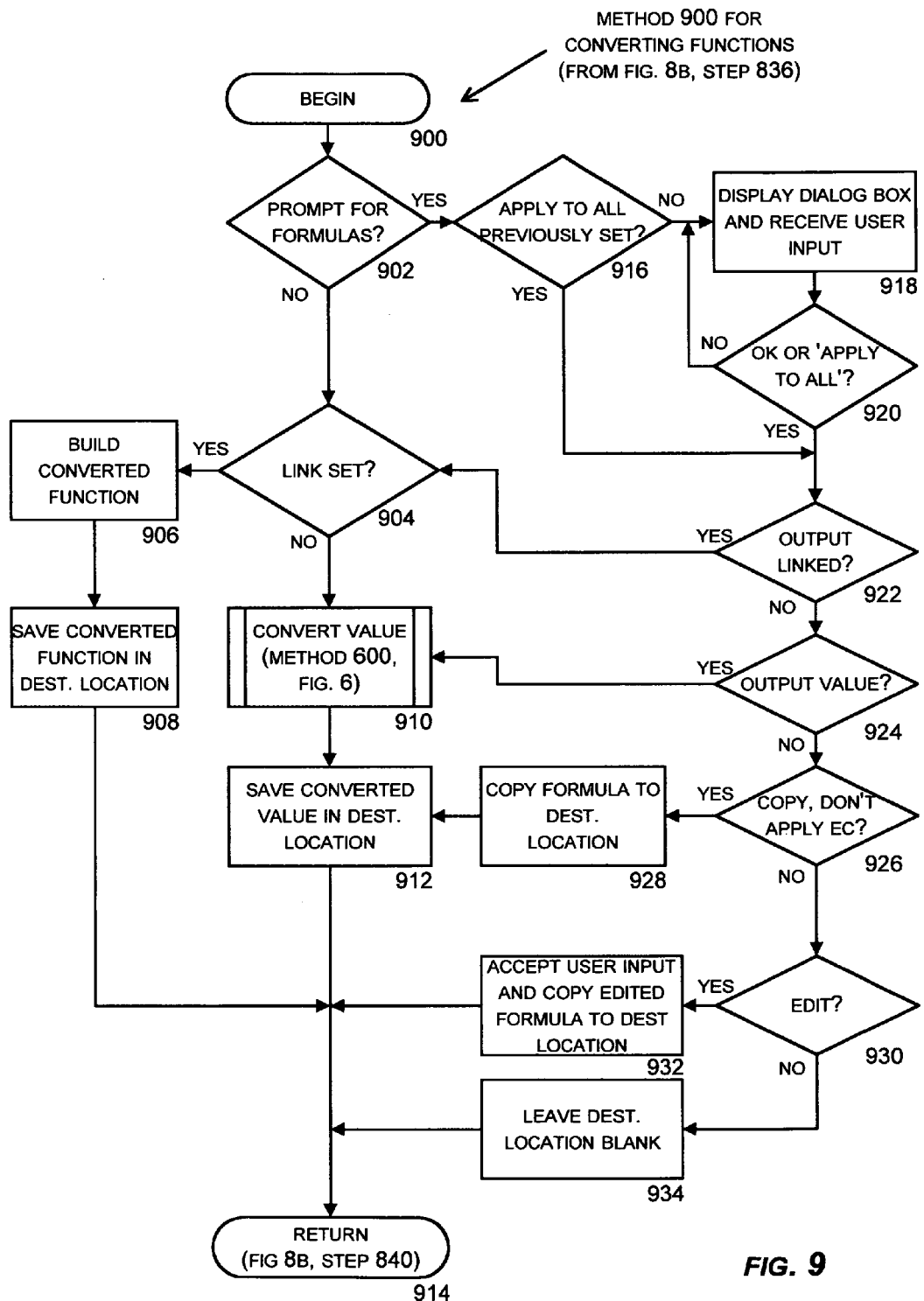
FIG. 9 is a flow diagram that illustrates an exemplary method for handling functions encountered during currency conversion.

If, at step 830, it is determined that the contents of source location is not a value, the method 800 continues to step 836, where a determination is made as to whether the contents of the source location contains a function. If the contents of the source location contains a function, the method 800 branches to step 838, where the formula is handled according to the user-specified formula handling rule described above. FIG. 9 illustrates an exemplary method for handling formulas encountered during the conversion process and is discussed below with respect to FIG. 9.

From step 838 and the "NO" branch of step 836, the method 800 continues to step 840, where a determination is made as to whether more source locations remain to be converted. If more source locations remain to be converted, the method 800 branches to step 842, where the contents of the next source location are retrieved. The method 800 then continues at step 830. If no more source locations remain to be converted, the method 800 ends at step 844.

Referring now to FIG. 9, the method 900 for converting functions encountered during the currency conversion process will be described. In an illustrative embodiment, the method 900 is performed in response to determining that a source location contains a function in step 836, FIG. 8B. The method 900 begins at step 902, where a determination is made as to whether a user prompt is to be provided prior to converting the function. As described above with respect to FIG. 3, in an illustrative embodiment a user may indicate that the formula be converted to values, that a prompt be provided allowing user input of formula-handling options prior to converting the formula, or that the converted formula be copied to the destination range and that the source range remain unmodified. If it is determined that no prompt is to be provided prior to conversion of the formula, the method 900 continues from step 902 to step 904.

At step 904, a determination is made as to whether the formula in the destination location should be "linked" to the source location by converting the function and copying it to the destination location without modifying the source location. If it is determined that the formula should be handled in this manner, the method 900 branches to step 906, where the formula itself is converted from the source type of currency to the destination type of currency. In an illustrative embodiment, this is accomplished by creating a converted function. For instance, if the function in the source location is "SUM (A1,A2)" where A1 and A2 are locations, the converted function is EUROCONVERT(SUM(A1,A2),DEM,EUR), where EUROCONVERT is the conversion function as described with respect to claim 6, and DEM and EUR represent the source and destination types of currency, respectively. In this manner, a converted function may be created. At step 908, the converted function is saved in the destination location. The method 900 then continues to step 914, where it returns to step 840, FIG. 8B.

If, at step 904, it is determined that the formula in the destination location should not be "linked" to the source location, the method 900 continues to step 910. At step 910, the formula is converted to a currency value. In an illustrative embodiment, the method 600, FIG. 6, for converting currency is utilized to perform the conversion. The method 900 then continues from step 910 to step 912, where the converted value is saved in the destination location. The method 900 then continues to step 914, where it returns to step 840, FIG. 8B.

If, at step 902, it is determined that a user prompt is to be provided prior to converting the function, the method 900 branches to step 916. At step 916, a determination is made as to whether a selection has previously been made indicating that a previously selected formula-handling option be applied to all future formulas. If such a determination is made, the method 900 branches from step 916, to step 922, bypassing steps 918 and 920. If such a determination is not made, the method 900 continues to step 918, where a dialog box is displayed on a display device and user input is received regarding how the formula should be handled. An illustrative dialog box is described above with respect to FIG. 4.

The method 900 continues from step 918 to step 920, where a determination is made as to whether the "OK" button or the "APPLY TO ALL" button have been selected. If either of these buttons have not been selected, the method 900 returns to step 918, where input is received. If either of these buttons have been selected, the method 900 continues to step 922.

At step 922, a determination is made as to whether a selection was made indicating that the destination formula should be "linked" to the source location as described above. If the destination formula should be "linked," the method 900 branches to step 904, where the formula may be converted and saved in the destination location as described above with respect to steps 904, 906, and 908. If the formula is not to be "linked," then method 900 continues to step 924, where a determination is made as to whether the formula should be converted to a currency value and saved in the destination location. If the formula is to be handled in this manner, the method 900 branches to step 910, where it is converted and saved in the destination location as described above with respect to steps 910 and 912. If the formula is not to be converted to a value, the method 900 continues to step 926.

At step 926, a determination is made as to whether the formula in the source location should be copied to the destination location without a currency conversion operation being applied to it. If the formula is to be handled in this manner, the method 900 branches to steps 928 and 912, where the formula in the source location is copied to the destination location and saved without any currency conversion. If, at step 926, it is determined that the formula should not be copied to the destination location without any currency conversion, the method 900 continues to step 930. At step 930, a determination is made as to whether a selection has been made indicating that the formula should be edited prior to saving in the destination location. If the formula is to be edited, the method 900 branches to step 932, where a user is permitted to edit the source formula and, the edited source formula is saved in the destination location when editing is completed. If the source formula is not to be edited, the method 900 continues to step 934, where the destination cell is left blank. The method 900 continues to step 914, where it returns to step 840, FIG. 8B.

Figure 10:
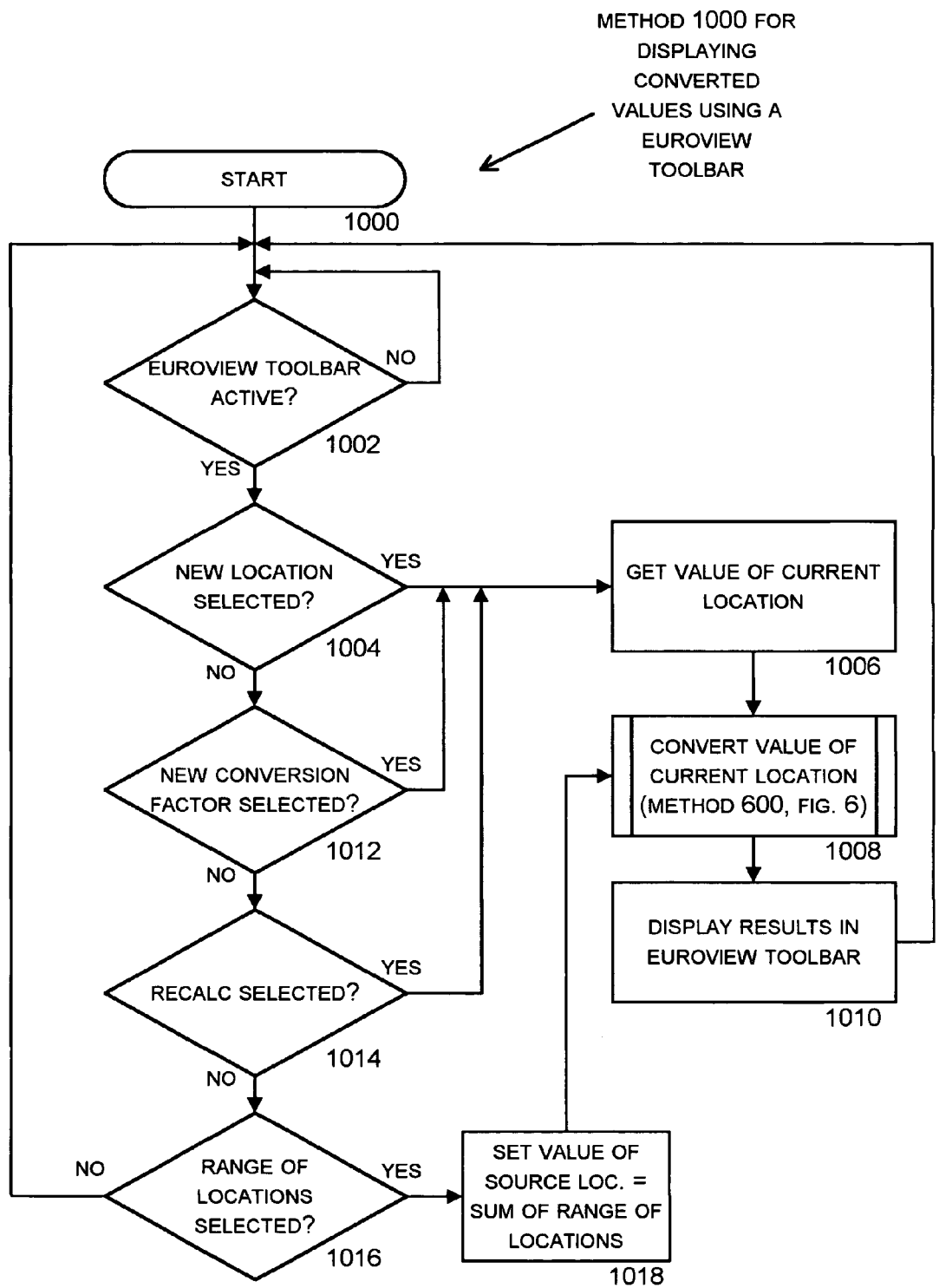
FIG. 10 is a flow diagram illustrating an exemplary method for displaying converted currency values using a EuroView toolbar.

Referring now to FIG. 10, a method 1000 for displaying converted values using a EuroView toolbar will be described. As discussed above with respect to FIG. 5, the EuroView toolbar "floats" above an associated application program, such as a spreadsheet, and provides quick and convenient access to the results of the conversion process. The method 1000 begins at step 1002, where a determination is made as to whether the EuroView toolbar is currently active. If the EuroView toolbar is not currently active, the method returns to step 1002, where another determination is made as to whether the toolbar is active. If the EuroView toolbar is active, the method 1000 continues to step 1004, where a determination is made as to whether a new location has been selected as a current location, like a cell in a spreadsheet, for instance.

If, at step 1004, it is determined that a new location has been selected, the method 1000 branches to step 1006, where the value of the current location is retrieved. The method 1000 then continues from step 1006 to step 1008, where the value of the current location is converted to the appropriate currency according to the currently selected currency conversion factor (for instance, EUR->FRF). In an illustrative embodiment, the method 600, FIG. 6, may be used to convert the value of the current location in this manner. The method 1000 then continues from step 1008 to step 1010, where the results of the currency conversion are displayed in the EuroView toolbar. The method 1000 then returns to step 1002.

If, at step 1004, it is determined that a new location has not been selected as the current location, the method 1000 continues to step 1012, where a determination is made as to whether a new currency conversion factor has been selected. In an illustrative embodiment, a dropdown menu, such as drop-down conversion options list 132, shown in FIG. 5, may be utilized for the display and selection of available conversion factors. If a new conversion factor has been selected, the method 1000 branches to step 1006, where the value of the current location is retrieved. The method 1000 then continues to steps 1008 and 1010, where the value is converted and displayed as described above with respect to these steps. If a new conversion factor has not been selected, the method continues to step 1014, where a determination is made as to whether a "recalculate" option has been selected. Such an option is typically available in spreadsheet application programs and, when selected, recalculates the entire active spreadsheet. If such an option has been selected, the method 1000 branches to step 1006, where the value of the current location is retrieved. The method 1000 then continues to steps 1008 and 1010, where the value is converted and displayed as described above with respect to these steps.

If, at step 1014, it is determined that a "recalculate" option has not been selected, the method 1000 continues to step 1016, where a determiination is made as to whether a range of source locations, such as cells in a spreadsheet, have been selected. If a range of source locations have not been selected, the method 1000 returns to step 1002. If a range of cells has been selected, the method 1000 branches to step 1018, where the values of the contents of each of the source locations are summed. The sum of the values of the source locations is then set as the current value. The method 1000 then branches to step 1008, where the current value is converted, and subsequently to step 1010, where the value is displayed. In this manner, the selection of a range of source locations will display the converted sum of the values in the EuroView toolbar.

In view of the foregoing, it will be appreciated that the present invention provides a method and apparatus for easily and quickly converting between the euro and other currencies. It will also be appreciated that the present invention provides a method and apparatus for applying a euro formatting style to euro currency values. It will further be appreciated that the present invention provides a method and apparatus for displaying converted results that advantageously allows quick selection of the destination currency and provides convenient access to the conversion results. It should be understood that the foregoing relates only to specific embodiments of the present invention, and that numerous changes may be made therein without departing from the spirit and scope of the invention as defined by the following claims.

What is claimed is:

1. A method for converting values and functions contained in a user-selected range of source cells and represented in an at least one source currency to an at least one destination currency using a conversion wizard provided by a spreadsheet application program executing on a computer, comprising:

determining, by the computer whether the user selected range of cells contains one of the following: values and functions, wherein the functions comprise at least one formula;

(a) providing, by the computer, in the spreadsheet application program, a conversion function for converting the values contained in the user-selected range of source cells to the at least one destination currency;

(b) receiving, by the computer, in the spreadsheet application program, a request for converting the values contained in the user-selected range of source cells to the at least one destination currency;

(c) receiving, by the computer, in the spreadsheet application program in conjunction with the request, a plurality of arguments in the conversion function wherein the arguments comprise:

a value in the at least one source currency to be converted;

the identity of the at least one source currency to be converted;

the identity of the at least one destination currency;

a full precision flag, wherein when the full precision flag is set, the conversion function ignores currency-specific rounding rules; and a triangulation value;

(d) applying, by the computer, in the spreadsheet application program, a predefined set of conversion rules to convert the value from the at least one source currency to the destination currency based upon the plurality of arguments received in the conversion;

(e) saving, by the computer, the converted value in a destination cell corresponding to a source cell in the user-selected range of source cells containing the value;

(f) in response to determining that the user selected range contains functions, determining, by the computer, whether a function comprising a formula in a destination location is to a source location by converting the function and copying the function to the destination cell without modifying the source location;

(g) in response to determining that the formula in the destination location is to the source location, converting, by the computer, the formula from the at least one source currency to the at least one destination currency to create a converted function, the converted function comprising a variable identifying the at least one source currency and a variable identifying the at least one destination currency;

(h) saving, by the computer, the converted function in the destination location; and (i) repeating, by the computer, steps (d) through (h) for each of the user-selected source cells.

2. The method of claim 1 further comprising receiving, by the computer, in the spreadsheet application program, a euro style format and applying the euro style format to the converted value in the destination cell corresponding to the source cell in the user-selected range of source cells containing the value.

3. A computer-readable medium having computer-executable instructions, which when executed by a computer, will cause the computer to perform a method for converting values and functions contained in a user-selected range of source cells and represented in an at least one source currency to an at least one destination currency using a conversion wizard provided by a spreadsheet application program, the method comprising:

determining whether the user selected range of cells contains one of the following: values and functions, wherein the functions comprise at least one formula;

(a) providing, in the spreadsheet application program, a conversion function for converting the values contained in the user-selected range of source cells to the at least one destination currency;

(b) receiving, in the spreadsheet application program, a request for converting the values contained in the user-selected range of source cells to the at least one destination currency;

(c) receiving, in the spreadsheet application program in conjunction with the request, a plurality of arguments in the conversion function wherein the arguments comprise:
   a value in the at least one source currency to be converted;
   the identity of the at least one source currency to be converted,
   the identity of the at least one destination currency;
   a full precision flag, wherein when the full precision flag is set, the conversion function ignores currency-specific rounding rules; and
   a triangulation value;
(d) applying, in the spreadsheet application program, a predefined set of conversion rules to convert the value from the at least one source currency to the destination currency based upon the plurality of arguments received in the conversion;
(e) saving the converted value in a destination cell corresponding to a source cell in the user-selected range of source cells containing the value;
(f) in response to determining that the user selected range contains functions, then determining whether a function comprising a formula in a destination location should be linked to a source location by converting the function and copying the function to the destination cell without modifying the source location;
(g) in response to determining that the formula in the destination location should be linked to the source location, then converting the formula from the at least one source currency to the at least one destination currency to create a converted function, the converted function comprising a variable identifying the at least one source currency and a variable identifying the at least one destination currency;
(h) saving the converted function in the destination location; and
(i) repeating steps (d) though (h) for each of the user-selected source cells.

4. In a computer system having a graphical user interface including a display and a user interface selection device, a method of displaying the results of a currency conversion within a spreadsheet application program, the method comprising:
   (a) displaying, by the computer system, in the spreadsheet application program, a toolbar on the display, the toolbar continuously displayed over a spreadsheet provided by the spreadsheet application program and having a drop-down menu comprising one or more currency conversion factors and a window within the toolbar for continuously displaying a converted value for a selected cell in the spreadsheet;
   (b) receiving, by the computer system, in the spreadsheet application program, the selection of a cell of the spreadsheet and a currency conversion factor from the drop-down menu;
   (c) in response to only the selection of one of the available currency conversion factors and the cell, converting, by the computer system, in the spreadsheet application program, the contents of the cell from a source currency to a destination currency defined by the selected currency conversion factor based upon a plurality of arguments received in the spreadsheet application program, wherein the arguments comprise:
      a value in the at least one source currency to be converted;
      the identity of the at least one source currency to be converted;
      the identity of the destination currency;
      a full precision flag, wherein when the full precision flag is set, the conversion function ignores currency-specific rounding rules; and
      a triangulation value; and
   (d) displaying, by the computer system, in the spreadsheet application program, the results of the currency conversion in the window within the toolbar for displaying a converted value on the display, wherein the converted value comprises a converted formula in a source location in the spreadsheet and wherein the formula is converted in response to a prompt for a user input indicating that the formula be converted to at least one value.

5. The method of claim 4, wherein step (c) comprises:
   (c) in response to only receiving user input selecting a source cell, converting a value in the source cell from an at least one source currency to an at least one destination currency according to the selected currency conversion factor.

6. The method of claim 4, wherein step (c) comprises:
   (c) in response to receiving user input selecting a recalculate function, converting a value in a source cell from a source currency to an at least one destination currency according to the selected currency conversion factor.

7. The method of claim 4, wherein step (c) comprises:
   (c) in response to receiving user input selecting a range of source cells, adding the value contained in each of the source cells to obtain a sum of the source cells, and converting the sum of the source cells from a source currency to a destination currency according to the selected currency conversion factor.

8. The method of claim 1 further comprising:
   in response to determining that the formula in the destination location should not be linked to the source location, converting, by the computer system, the formula to a currency value; and
   saving, by the computer system, the value in the destination location.

9. The method of claim 1 further comprising:
   determining, by the computer system, whether to provide a user prompt prior to converting the function;
   in response to determining that a user prompt is to be provided, determining, by the computer system, whether a selection has previously been made indicating that a previously selected formula-handling option to be applied to all future formulas; and
   in response to determining that a selection has previously not been made, receiving, by the computer system, a user input regarding how the formula is to be handled.

10. The method of claim 1 further comprising:
   determining, by the computer system, whether the formula in the source location should be copied to the destination location without a currency conversion operation being applied to the formula; and
   in response to determining that the formula in the source location should be copied to the destination location without a currency conversion operation being applied to the formula, copying, by the computer system, the formula to the destination location and saving the formula without the currency conversion.

* * * * *